(12) United States Patent
Wakamura et al.

(10) Patent No.: US 10,407,319 B2
(45) Date of Patent: Sep. 10, 2019

(54) PHOTOCATALYTIC FILTER, PURIFICATION DEVICE, AND PURIFICATION METHOD

(71) Applicant: FUJITSU LIMITED, Kawasaki-shi, Kanagawa (JP)

(72) Inventors: Masato Wakamura, Sakai (JP); Mineharu Tsukada, Hadano (JP); Toshihisa Anazawa, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 119 days.

(21) Appl. No.: 15/696,678

(22) Filed: Sep. 6, 2017

(65) Prior Publication Data
US 2017/0362096 A1 Dec. 21, 2017

Related U.S. Application Data

(63) Continuation of application No. PCT/JP2015/057051, filed on Mar. 10, 2015.

(51) Int. Cl.
| | |
|---|---|
| *C02F 1/32* | (2006.01) |
| *B01J 27/182* | (2006.01) |
| *B01J 20/10* | (2006.01) |
| *B01J 20/14* | (2006.01) |

(Continued)

(52) U.S. Cl.
CPC ............ *C02F 1/325* (2013.01); *B01J 20/103* (2013.01); *B01J 20/14* (2013.01); *B01J 20/18* (2013.01); *B01J 27/182* (2013.01); *B01J 27/1802* (2013.01); *B01J 35/004* (2013.01); *B01J 35/0006* (2013.01); *B01J 35/023* (2013.01); *B01J 35/026* (2013.01); *B01J 35/08* (2013.01); *B01J 37/009* (2013.01); *B01J 37/0018* (2013.01); *B01J 37/0072* (2013.01); *B01J 37/0219* (2013.01); *B01J 37/0236* (2013.01);

(Continued)

(58) Field of Classification Search
CPC .... B01J 37/0221; B01J 20/103; B01J 37/009; B01J 37/0072; B01J 37/0018; B01J 35/08; B01J 35/026; B01J 35/004; B01J 35/0006; B01J 27/182; C02F 2103/42; C02F 2209/40; C02F 2303/04; C02F 2305/10
See application file for complete search history.

(56) References Cited

U.S. PATENT DOCUMENTS

| | | | |
|---|---|---|---|
| 2007/0149389 A1 | 6/2007 | Kurihara | |
| 2007/0232487 A1* | 10/2007 | Naganuma | .......... B01D 53/885 502/208 |

FOREIGN PATENT DOCUMENTS

| | | |
|---|---|---|
| JP | 3044655 U | 1/1998 |
| JP | H10-085606 A | 4/1998 |

(Continued)

OTHER PUBLICATIONS

International Search Report for International Application No. PCT/JP2015/057051 dated Jun. 16, 2015.

*Primary Examiner* — Walter D. Griffin
*Assistant Examiner* — Cameron J Allen
(74) *Attorney, Agent, or Firm* — Kratz, Quintos & Hanson, LLP

(57) ABSTRACT

A photocatalytic filter including first photocatalytic particles each of which is a composite of an adsorbent and titanium apatite, second photocatalytic particles each of which is glass coated with titanium apatite, a light source configured to emit ultraviolet rays, and a container accommodating the first photocatalytic particles, the second photocatalytic particles, and the light source.

8 Claims, 7 Drawing Sheets

(51) Int. Cl.
*B01J 20/18* (2006.01)
*B01J 27/18* (2006.01)
*B01J 35/00* (2006.01)
*B01J 35/02* (2006.01)
*B01J 35/08* (2006.01)
*B01J 37/00* (2006.01)
*B01J 37/02* (2006.01)
*B01J 37/03* (2006.01)
*B01J 37/04* (2006.01)
*B01J 37/08* (2006.01)
*C02F 1/00* (2006.01)
*C02F 1/28* (2006.01)
*C02F 1/72* (2006.01)
*C02F 103/42* (2006.01)

(52) U.S. Cl.
CPC .......... *B01J 37/036* (2013.01); *B01J 37/04* (2013.01); *B01J 37/08* (2013.01); *C02F 1/004* (2013.01); *C02F 1/281* (2013.01); *C02F 1/725* (2013.01); *B01J 37/0221* (2013.01); *C02F 2103/42* (2013.01); *C02F 2201/3223* (2013.01); *C02F 2209/005* (2013.01); *C02F 2209/11* (2013.01); *C02F 2209/40* (2013.01); *C02F 2303/04* (2013.01); *C02F 2305/10* (2013.01)

(56) References Cited

FOREIGN PATENT DOCUMENTS

| | | | |
|---|---|---|---|
| JP | 2001-096169 | A1 | 4/2001 |
| JP | 2001-293071 | A1 | 10/2001 |
| JP | 2002-233735 | A1 | 8/2002 |
| JP | 2004-002176 | A1 | 1/2004 |
| JP | 2006-130365 | A1 | 5/2006 |
| JP | 2007-167784 | A1 | 7/2007 |

* cited by examiner

PHOTOCATALYTIC FILTER, PURIFICATION DEVICE, AND PURIFICATION METHOD

CROSS-REFERENCE TO RELATED APPLICATION

This application is a continuation application of International Application PCT/JP2015/057051 filed on Mar. 10, 2015 and designated the U.S., the entire contents of which are incorporated herein by reference.

FIELD

The embodiments discussed herein relate to a photocatalytic filter, and a purification device and a purification method using the photocatalytic filter.

BACKGROUND

For purification of water quality of swimming pools installed in sports facilities, theme parks, etc., purification of water quality of water tanks installed in aquariums, and purification of the atmosphere, a purification technique of an adsorption system using activated carbon, a purification technique of a sterilization system using hypochlorous acid, etc., have been used.

However, the adsorption system using activated carbon has a problem that replacement of activated carbon is performed frequently when a large quantity is purified.

Moreover, the sterilization system using hypochlorous acid has a problem of odor, skin irritation, etc., due to chlorine residues.

Furthermore, it is difficult to remove fine organic pollutants using the above-described purification techniques.

Therefore, a purification technique using a photocatalyst is proposed as a purification technique that is harmless to human bodies, has less frequent replacements of a filter material, and is capable of removing fine organic pollutants (see, for example, Japanese Registered Utility Model No. 3044655, and Japanese Patent Application Laid-Open (JP-A) Nos. 10-85606, 2006-130365, 2001-293071, and 2007-167784). In the proposed techniques, purification is performed by applying ultraviolet rays to a photocatalyst that is titanium dioxide or optionally a carrier to which titanium oxide that is a photocatalyst is born.

However, the proposed technique has a problem that it is difficult for ultraviolet rays to reach the photocatalyst far from a light source of ultraviolet rays and therefore purification performance is not sufficient.

SUMMARY

The disclosed photocatalytic filter includes first photocatalytic particles each of which is a composite of an adsorbent and titanium apatite, second photocatalytic particles each of which is glass coated with titanium apatite, a light source configured to emit ultraviolet rays, and a container accommodating the first photocatalytic particles, the second photocatalytic particles, and the light source.

The disclosed purification device includes the disclosed photocatalytic filter.

The disclosed purification method uses the disclosed photocatalytic filter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS (Photocatalytic Filter)

Figure 1A:
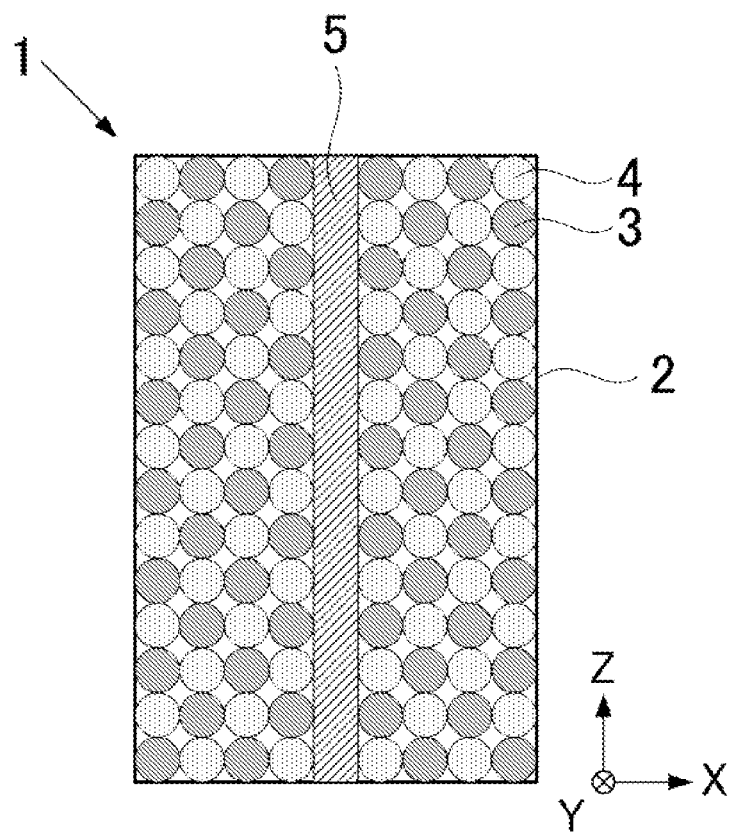
FIG. 1A is a schematic X-Z cross-sectional view illustrating one example of a photocatalytic filter.

The disclosed photocatalytic filter includes at least first photocatalytic particles, second photocatalytic particles, a light source, and a container, and may further include other members according to the necessity.

<First Photocatalytic Particles>

The first photocatalytic particles are each a composite of an adsorbent and titanium apatite.

The first photocatalytic particles include at least the adsorbent and the titanium apatite, and may further include other ingredients according to the necessity.

<<Adsorbent>>

The adsorbent is not particularly limited and may be appropriately selected depending on the intended purpose. Examples of the adsorbent include diatomaceous earth, zeolite, and silica.

The adsorbent preferably has optical transparency to near ultraviolet rays of from 350 nm to 400 nm that are effective in photocatalytic activities.

A specific surface area of the diatomaceous earth is, for example, from about 10 m$^2$/g to about 100 m$^2$/g, and the diatomaceous earth has a specific surface area similar to typical ceramic powder. However, the diatomaceous earth is not aggregates of fine powder but is a collection of relatively large particles having complex pores. Since the diatomaceous earth has a unique structure, the diatomaceous earth is excellent in adsorption of moisture and various gases even through the specific surface area of the diatomaceous earth is similar to the specific surface area of the ceramic powder.

Since a main component of each of the diatomaceous earth, the zeolite, and the silica is SiO$_2$, the diatomaceous earth, the zeolite, and the silica have optical transparency to near ultraviolet rays of from 350 nm to 400 nm that are effective in photocatalytic activities. Therefore, ultraviolet rays emitted from the light source reach the second photocatalytic particles even when the first photocatalytic particles are present between the light source and the second photocatalytic particles in the photocatalytic filter. Moreover, the first photocatalytic particles can exhibit photocatalytic performance even when the titanium apatite is present inside each of the diatomaceous earth, the zeolite, and the silica.

An amount of the adsorbent in the first photocatalytic particles is not particularly limited and may be appropriately selected depending on the intended purpose. The amount of the adsorbent is preferably from 5% by mass to 95% by mass, more preferably from 5% by mass to 40% by mass, and particularly preferably from 10% by mass to 30% by mass.

<<Titanium Apatite>>

The titanium apatite means a material where part of titanium is substituted with calcium apatite. It has been known that the titanium apatite exhibits photocatalytic performance.

The titanium apatite may be hydrate. For example, the titanium apatite is represented by Ca$_9$Ti(PO$_4$)$_6$(OH)$_2$ where part of calcium in calcium hydroxyapatite represented by Ca$_{10}$(PO$_4$)$_6$(OH)$_2$ is substituted with titanium.

Note that, a ratio between calcium, titanium, and phosphorous in the titanium apatite does not need to completely match the composition above. For example, a compound is treated as the titanium apatite, as long as a diffraction pattern indicating an apatite structure is obtained as a result of a measurement of a crystal phase of the compound by X-ray diffraction, Ca and Ti that are metal components of the titanium apatite are detected as a result of a surface analysis of powder of the compound by XPS, and the compound exhibits a function as a photocatalyst. Since apatite is a crystal having strong iconicity and is easy to perform substitution with a metal ion, the apatite can include various elements. Accordingly, a compound can be treated as the titanium apatite even when elements other than Ca and Ti are included in the compound, as long as the compound has a photocatalytic function and a crystal structure of apatite.

An amount of the titanium apatite in the first photocatalytic particles is not particularly limited and may be appropriately selected depending on the intended purpose. The amount of the titanium apatite is preferably from 5% by mass to 95% by mass, more preferably from 30% by mass to 70% by mass, and particularly preferably from 40% by mass to 60% by mass.

<<Other Ingredients>>

The above-mentioned other ingredients are not particularly limited and may be appropriately selected depending on the intended purpose. Examples of the above-mentioned other ingredients include a binder. The binder is not particularly limited and may be appropriately selected depending on the intended purpose, as long as the binder can bind the adsorbent and the titanium apatite together. Examples of the binder include clay.

The clay is not particularly limited and may be appropriately selected depending on the intended purpose. Examples of the clay include natural clay and synthetic clay. Specific examples of the clay include stevensite, hectrite, saponite, montmorillonite, and beidellite. The above-listed examples may be used alone or in combination.

An amount of the clay in the first photocatalytic particles is not particularly limited and may be appropriately selected depending on the intended purpose. The amount of the clay is preferably from 10% by mass to 50% by mass, more preferably from 15% by mass to 45% by mass, and particularly preferably from 20% by mass to 40% by mass.

The average particle diameter of the first photocatalytic particles is not particularly limited and may be appropriately selected depending on the intended purpose. The average particle diameter of the first photocatalytic particles is preferably from 0.1 mm to 5 mm, more preferably from 0.2 mm to 3 mm, and particularly preferably from 0.5 mm to 2.0 mm.

For example, particle diameters of the first photocatalytic particles can be determined from maximum diameters of projected images when the first photocatalytic particles are projected to a projection surface in a manner that a projection area of each particle is to be maximum. The maximum diameter is a length between arbitrary 2 points on the outer outline on the projected image area when the 2 points are selected in a manner that the length between the 2 points is to be maximum. The average particle diameter can be determined as an arithmetic means value when particle diameters of arbitrary 50 particles of the first photocatalytic particles are measured.

<<Production Method of First Photocatalytic Particles>>

A method for producing the first photocatalytic particles through formation a composite of the adsorbent and the titanium apatite is not particularly limited and may be appropriately selected depending on the intended purpose. Examples of the method include dry methods and wet methods.

Examples of the dry methods include a method where the adsorbent, the titanium apatite, and the clay are mixed. In the dry method, after dry mixing the ingredients, it is preferred that particles of a certain size be formed and be baked. A temperature for the baking is preferably a temperature at which a crystal structure of the titanium apatite is not destroyed, and is more preferably from 400° C. to 600° C.

Examples of the wet methods include a co-precipitation method and a sol-gel method. Examples of the co-precipitation method and the sol-gel method include methods disclosed in Japanese Patent Application Laid-Open (JP-A) No. 2007-167784.

<Second Photocatalytic Particles>

The second photocatalytic particles are each glass coated with titanium apatite.

The second photocatalytic particles include at least the glass and the titanium apatite, and may further include other ingredients according to the necessity.

A refractive index of titanium dioxide is about 2.6 which is largely different from a refractive index of the glass that is about 1.5. Therefore, photocatalytic particles formed by coating glass with titanium dioxide cause interference at an interface between the glass and the titanium dioxide. As a result, such photocatalytic particles have low optical transparency.

Meanwhile, a refractive index of the titanium apatite is about 1.6 which is close to about 1.5 that is the refractive index of the glass. Therefore, interference hardly occurs at an interference between the glass and the titanium apatite in the second photocatalytic particles. As a result, the second photocatalytic particles has excellent optical transparency.

<<Glass>>

The glass is not particularly limited and may be appropriately selected depending on the intended purpose. Examples of the glass include non-alkali glass and silica glass.

An amount of the glass in the second photocatalytic particles is not particularly limited and may be appropriately selected depending on the intended purpose. The amount of the glass is preferably from 5% by mass to 95% by mass, more preferably from 5% by mass to 40% by mass, and particularly preferably from 10% by mass to 30% by mass.

<<Titanium Apatite>>

The titanium apatite means a material where part of titanium is substituted with calcium apatite. It has been known that the titanium apatite exhibits photocatalytic performance.

The details of the titanium apatite are as described in the description of the first photocatalytic particles.

An amount of the titanium apatite in the second photocatalytic particles is not particularly limited and may be appropriately selected depending on the intended purpose. The amount of the titanium apatite is preferably from 5% by mass to 95% by mass, more preferably from 30% by mass to 70% by mass, and particularly preferably from 40% by mass to 60% by mass.

The average particle diameter of the second photocatalytic particles is not particularly limited and may be appropriately selected depending on the intended purpose. The average particle diameter is preferably from 0.1 mm to 5 mm, more preferably from 0.2 mm to 3 mm, and particularly preferably from 0.5 mm to 2.0 mm.

For example, particle diameters of the second photocatalytic particles can be determined from maximum diameters of projected images when the second photocatalytic particles are projected to a projection surface in a manner that a projection area of each particle is to be maximum. The maximum diameter is a length between arbitrary 2 points on the outer outline on the projected image area when the 2 points are selected in a manner that the length between the 2 points is to be maximum. The average particle diameter can be determined as an arithmetic means value when particle diameters of arbitrary 50 particles of the second photocatalytic particles are measured.

An absolute value of a difference between the average particle diameter of the first photocatalytic particles and the average particle diameter of the second photocatalytic particles is not particularly limited and may be appropriately selected depending on the intended purpose. The absolute value of the difference is preferably 0.3 times or less the average particle diameter of the first photocatalytic particles and more preferably 0.2 times or less the average particle diameter of the first photocatalytic particles in view of easiness of an alternate arrangement of the first photocatalytic particles and the second photocatalytic particles in the container.

<<Production Method of Second Photocatalytic Particles>>

A method for producing the second photocatalytic particles through coating of the glass with the titanium apatite is not particularly limited and may be appropriately selected depending on the intended purpose. Examples of the method include wet methods.

Examples of the wet methods include a co-precipitation method and a sol-gel method.

—Co-Precipitation Method—

The co-precipitation method is a method where a titanium compound is allowed to present during synthesis of calcium apatite to obtain titanium apatite through co-precipitation. Specific examples of the co-precipitation method include a method where calcium nitrate, phosphoric acid, and titanium sulfate are added to water serving as a medium to obtain an acidic aqueous solution, and a titanium apatite-precipitating agent (e.g., ammonium water) is added to the acidic aqueous solution to obtain precipitates.

The second photocatalytic particles can be obtained by precipitating the titanium apatite generated by the co-precipitation method on surfaces of granules of the glass. More specifically, the glass is allowed to be present in a medium used for forming titanium apatite during formation of titanium apatite by the co-precipitation method.

In this case, the glass is preferably added to the medium before the titanium apatite starts precipitating in a reaction system. More specifically, the glass is preferably added to the medium before adding the titanium apatite-precipitating agent. The titanium apatite-precipitating agent is typically an agent configured to change a reaction system that is an acidic atmosphere to basic to precipitate the titanium apatite. Examples of the titanium apatite-precipitating agent include basic materials. The basic material is preferably ammonia water.

Note that, there is no use for adding the glass before adding all of raw materials constituting the titanium apatite including calcium, titanium, and phosphorous to a medium, and addition of the glass at such timing may possibly induce side reactions. Therefore, the glass is preferably added to the medium after adding all of raw material constituting the titanium apatite including calcium, titanium, and phosphorous to the medium but before adding the titanium apatite-precipitating agent.

It is often a case that the adjustment of a generating speed of the titanium apatite by the co-precipitation method is effective for optimizing photocatalytic activities because a precipitating speed of the titanium apatite on surfaces of granules of the glass (accordingly, speed of coating the glass with the titanium apatite) can be adjusted.

—Sol-Gel Method—

The sol-gel method is a method where a sol, such as hydrous oxide, is turned into a gel by a dehydration treatment, and the gel is optionally heated to process into a shape of particles, a film, etc. Generally, inorganic oxide is obtained by the sol-gel method, but in the disclosed technique, titanium apatite or hydrate of titanium apatite is obtained.

In case of the sol-gel method, the glass is added to a liquid including the titanium apatite generated by the sol-gel method, or raw materials of the titanium apatite, or an intermediate product of the titanium apatite, and the titanium apatite is precipitated on surfaces of granules of the glass to obtain the second photocatalytic particles. The "titanium apatite generated by the sol-gel method" may be in the state of a sol, or in the state of a gel, or in a mixed state. However, the condition where the titanium apatite has a less proportion of a gel state component is preferable in order to prevent generation of particles formed of only the titanium apatite. A method where the glass is added to the titanium apatite in a sol state or the state before the sol state, followed by performing gelation to coat the glass with the titanium apatite is the most reasonable and is preferable.

In the sol-gel method, a titanium concentration in a liquid including the titanium apatite generated, raw materials of the titanium apatite, or an intermediate product of the titanium apatite is preferably 0.5% by mass or less based on a conversion value of the titanium apatite, in order to prevent precipitate particles formed of only the titanium apatite. The lower limit of the titanium concentration is not particularly limited, but the lower limit is preferably 0.001% by mass or greater in view of production efficiency.

Moreover, a method where a liquid including the titanium apatite generated, raw materials of the titanium apatite, or an intermediate product of the titanium apatite is diluted before adding the glass to the reaction system is also effective. According to the method as described, a reaction before dilution can be efficiently performed, and precipitation of particles formed of only the titanium apatite can be prevented. The timing of dilution is not particularly limited, but it is generally suitable if the dilution is performed before gelation of the titanium apatite.

A mass ratio of the first photocatalytic particles to the second photocatalytic particles (first photocatalytic particles:second photocatalytic particles) is not particularly limited and may be appropriately selected depending on the intended purpose. The mass ratio is preferably from 30:70 to 70:30, more preferably from 40:60 to 60:40, and particularly preferably from 45:55 to 55:45.

A volume ratio of the first photocatalytic particles to the second photocatalytic particles (first photocatalytic particles:second photocatalytic particles) is not particularly limited and may be appropriately selected depending on the intended purpose. The volume ratio is preferably from 30:70 to 70:30, more preferably from 40:60 to 60:40, and particularly preferably from 45:55 to 55:45.

<Light Source>

The light source is not particularly limited and may be appropriately selected depending on the intended purpose, as long as the light source emits ultraviolet rays. Examples of the light source include fluorescent lamps (e.g., black lights), incandescent lamps, metal-halide lamps, mercury lamps, and light emitting diodes (LED).

Ultraviolet rays emitted from the light source preferably include ultraviolet rays of, for example, from 290 nm to 390 nm.

A shape of the light source is not particularly limited and may be appropriately selected depending on the intended purpose. Examples of the shape include a spherical shape and a rod shape. Among the above-listed examples, the shape of the light source is preferably a rod shape when the container has a cylindrical shape.

<Container>

The container is not particularly limited and may be appropriately selected depending on the intended purpose, as long as the container can accommodate the first photocatalytic particles, the second photocatalytic particles and the light source.

In the photocatalytic filter, the first photocatalytic particles, the second photocatalytic particles, and the light source are accommodated in the container.

A material of the container is not particularly limited and may be appropriately selected depending on the intended purpose. Examples of the container include glass, metals, and plastics.

A shape of the container is not particularly limited and may be appropriately selected depending on the intended purpose. The shape is preferably a cylindrical shape.

A size of the container is not particularly limited and may be appropriately selected depending on the intended purpose.

A structure of the container is not particularly limited and may be appropriately selected depending on the intended purpose.

The container preferably has an inlet from which a process-target fluid is introduced inside the container and an outlet from which the process-target fluid is discharged out of the container. Positions of the inlet and the outlet in the container are not particularly limited and may be appropriately selected depending on the intended purpose, but the inlet and the outlet are preferably arranged to face each other. In a case where the container is in a shape of a cylinder, for example, the inlet is preferably arranged at one of bases of the cylinder of the container, and the outlet is preferably arranged at the other base of the cylinder of the container.

The process-target fluid may be a liquid or gas. Examples of the liquid include water of swimming pools, and water of water tanks.

In the photocatalytic filter, it is preferred that a shape of the container be a cylindrical shape, a shape of the light source be a rod shape, and the light source be arranged on a central axis of the container, because ultraviolet rays emitted from the light source can be uniformly delivered inside the container.

Inside the container, the first photocatalytic particles and the second photocatalytic particles are preferably alternately arranged because such an arrangement enables ultraviolet rays emitted from the light source to reach far. The alternate arrangement of the first photocatalytic particles and the second photocatalytic particles inside the container is not limited as long as the alternate arrangement is an alternate arrangement at least relative to a monoaxial direction. The alternate arrangement is preferably an alternate arrangement relative to two axial directions (X-Y axial directions orthogonal to each other) and more preferably an alternate arrangement relative to three axial directions (X-Y-Z axial directions orthogonal to one another).

A method for alternately arranging the first photocatalytic particles and the second photocatalytic particles is not particularly limited and may be appropriately selected depending on the intended purpose. Examples of the method include a method where after arranging the first photocatalytic particles at positions corresponding to one color of a checkerboard pattern, the second photocatalytic particles are arranged at positions corresponding to the other color of the checkerboard pattern. According to the method as described, the first photocatalytic particles and the second photocatalytic particles are arranged in the state of the checkerboard pattern. By three-dimensionally stacking the above-mentioned alternate arrangement, the first photocatalytic particles and the second photocatalytic particles can be alternately arranged inside the container.

Examples of the photocatalytic filter will be described with reference to drawings hereinafter.

Figure 1B:
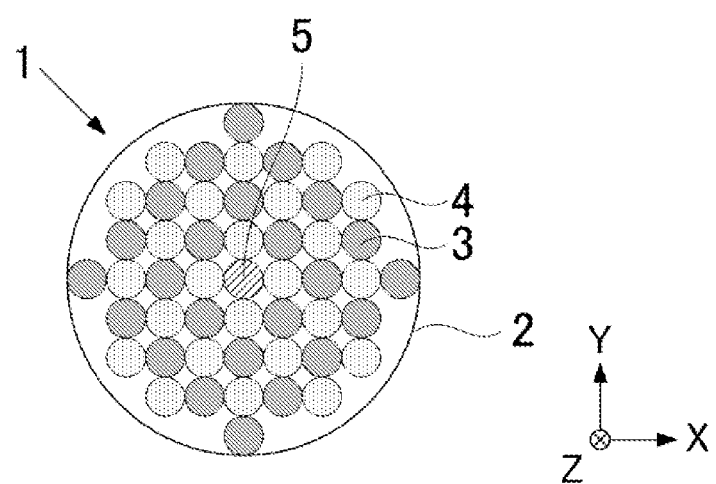
FIG. 1B is a schematic top view illustrating one example of the photocatalytic filter.

FIGS. 1A and 1B are schematic views illustrating one example of the photocatalytic filter. FIG. 1A is an X-Z cross-sectional view. FIG. 1B is a top view.

The photocatalytic filter 1 in FIGS. 1A and 1B includes a container 2, first photocatalytic particles 3, second photocatalytic particles 4, and a light source 5. The container 2 is in the shape of a cylinder. The light source 5 is in the shape of a rod. The light source 5 is arranged on a central axis of the container 2. The X-Z cross-section is a cross-section cut along the central axis of the container 2.

In the photocatalytic filter 1 of FIGS. 1A and 1B, the first photocatalytic particles 3 and the second photocatalytic particles 4 are alternately arranged relative to any of an X-axial direction, a Y-axial direction, and a Z-axial direction which are orthogonal to one another. Note that, in FIGS. 1A and 1B, the X axis and the Y axis are orthogonal to the central axis of the container 2, and the Z axis is parallel to the central axis of the container 2.

Figure 2A:
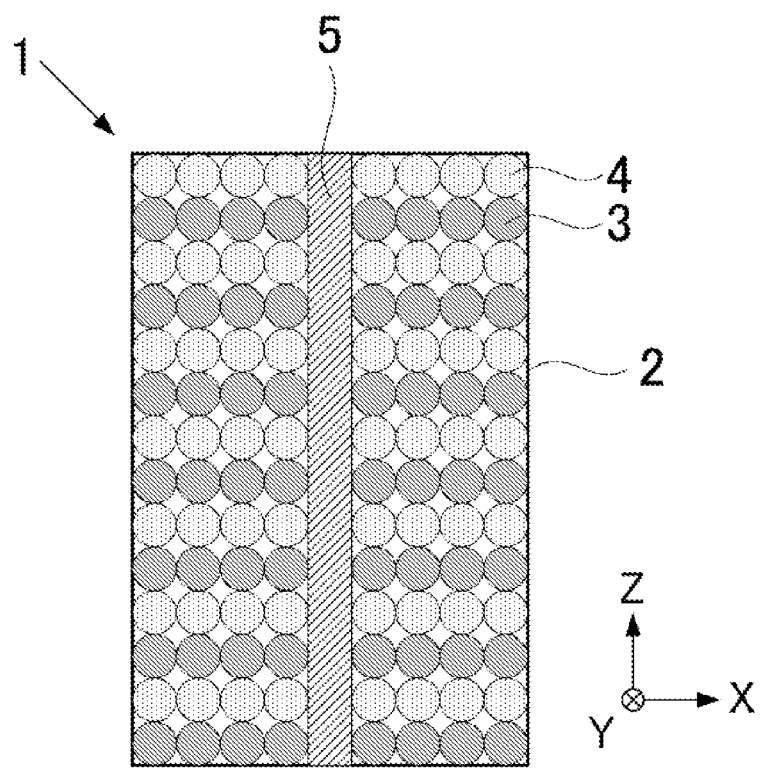
FIG. 2A is a schematic X-Z cross-sectional view illustrating another example of the photocatalytic filter.
Figure 2B:
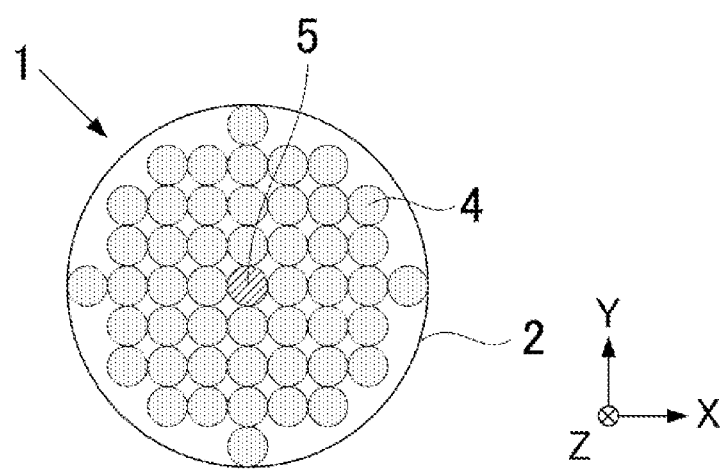
FIG. 2B is a schematic top view illustrating another example of the photocatalytic filter.

FIGS. 2A and 2B are schematic views illustrating another example of the photocatalytic filter. FIG. 2A is an X-Z cross-sectional view. FIG. 2B is a top view.

The photocatalytic filter 1 in FIGS. 2A and 2B includes a container 2, first photocatalytic particles 3, second photocatalytic particles 4, and a light source 5. The container 2 is in the shape of a cylinder. The light source 5 is in the shape of a rod. The light source 5 is arranged on a central axis of the container 2. The X-Z cross-section is a cross-section cut along the central axis of the container 2.

In the photocatalytic filter 1 of FIGS. 2A and 2B, the first photocatalytic particles 3 and the second photocatalytic particles 4 are alternately arranged relative to a Z-axial direction. Each of the first photocatalytic particles 3 and the second photocatalytic particles 4 are arranged in layers along the X-Y plane direction. Note that, in FIGS. 2A and 2B, the X axis and the Y axis are orthogonal to the central axis of the container 2 and the Z axis is parallel to the central axis of the container 2.

Figure 3A:
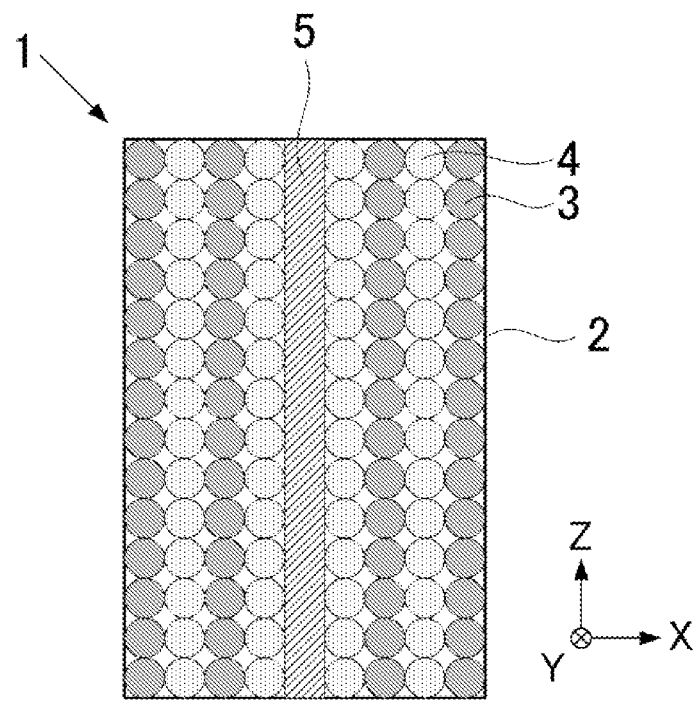
FIG. 3A is a schematic X-Z cross-sectional view illustrating yet another example of the photocatalytic filter.
Figure 3B:
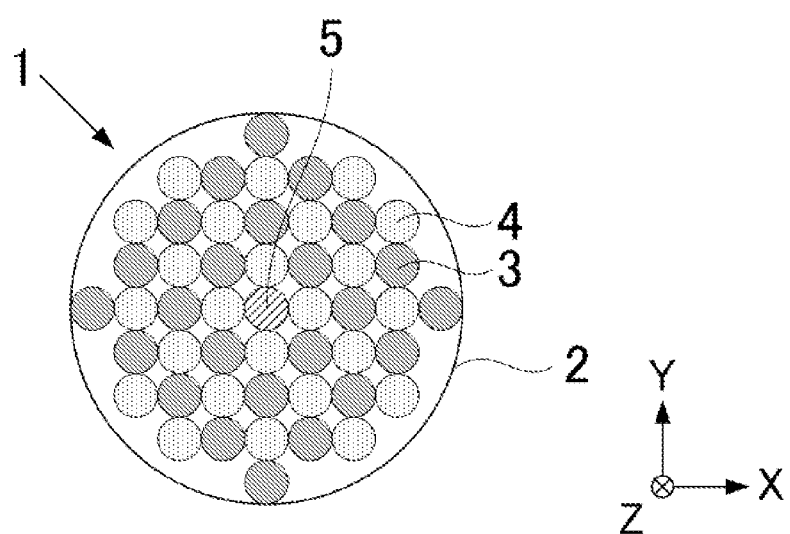
FIG. 3B is a schematic top view illustrating yet another example of the photocatalytic filter.

FIGS. 3A and 3B are schematic view illustrating one example of the photocatalytic filter. FIG. 3A is an X-Z cross-sectional view. FIG. 3B is a top view.

The photocatalytic filter 1 in FIGS. 3A and 3B includes a container 2, first photocatalytic particles 3, second photocatalytic particles 4, and a light source 5. The container 2 is in the shape of a cylinder. The light source 5 is in the shape of a rod. The light source 5 is arranged on a central axis of the container 2. The X-Z cross-section is a cross-section cut along the central axis of the container 2.

In the photocatalytic filter 1 of FIGS. 3A and 3B, the first photocatalytic particles 3 and the second photocatalytic particles 4 are alternately arranged relative to any of an X-axial direction and a Y-axial direction that are orthogonal to each other. Each of the first photocatalytic particles 3 and the second photocatalytic particles 4 are arranged in lines relative to a Z-axial direction. Note that, in FIGS. 3A and 3B, the X axis and the Y axis are orthogonal to the central axis of the container 2, and the Z axis is parallel to the central axis of the container 2.

Note that, arrangements of the first photocatalytic particles and the second photocatalytic particles inside the container are not limited to FIGS. 1A, 1B, 2A, 2B, 3A, and 3B. For example, the arrangement may be an arrangement where the first photocatalytic particles and the second photocatalytic particles are arranged in the closely packed state while alternately arranging the first photocatalytic particles and the second photocatalytic particles. Moreover, the arrangement may be an arrangement where the first photocatalytic particles and the second photocatalytic particles are arranged in the closely packed state while disorderly arranging the first photocatalytic particles and the second photocatalytic particles.

Since the first photocatalytic particles and the second photocatalytic particles are accommodated in the container in the photocatalytic filter, ultraviolet rays easily reach the photocatalytic particles far from the light source and therefore the photocatalytic filter exhibits excellent purification performance.

In the case where only the first photocatalytic particles are accommodated in the container (the second photocatalytic particles are not accommodated in the container), on the other hand, the adsorbent gradually absorbs ultraviolet rays and therefore ultraviolet rays do not easily reach the first photocatalytic particles far from the light source. Accordingly, purification performance of such a photocatalytic filter is lower than purification performance of the disclosed photocatalytic filter.

In the case where the first photocatalytic particles and granular glass are accommodated in the container, moreover, ultraviolet rays reach the first photocatalytic particles far from the light source owing to ultraviolet transparency of the granular glass. Since a total amount of the photocatalytic particles is reduced by the amount of the granular glass accommodated, however, purification performance of such a photocatalytic filter is lower than purification of the disclosed photocatalytic filter.

In the case where the first photocatalytic particles and photocatalytic particles formed by coating glass with titanium dioxide are accommodated in the container, moreover, ultraviolet rays easily reach the first photocatalytic particles far from the light source and the photocatalytic particles formed by coating glass with titanium dioxide far from the light source owing to ultraviolet transparency of the photocatalytic particles formed by coating glass with titanium dioxide. However, the photocatalytic particles formed by coating glass with titanium dioxide cause interference at an interface between the glass and the titanium dioxide to reduce ultraviolet rays. Therefore, the ultraviolet transparency is lower than the ultraviolet transparency of the second photocatalytic particles. Accordingly, purification performance of such a photocatalytic filter is lower than purification performance of the disclosed photocatalytic filter.

Moreover, the photocatalytic filter uses the photocatalyst, and therefore organic pollutants are decomposed and are hardly accumulated. Therefore, frequency of replacement of the filter can be reduced.

(Purification Device and Purification Method)

The disclosed purification device includes at least the disclosed photocatalytic filter, and may further include other members according to the necessity.

The disclosed purification method uses the disclosed photocatalytic filter.

The purification device preferably further includes a filtration filter, a main flow passage, a measuring unit, a first auxiliary flow passage, a switching unit, and a second auxiliary flow passage. The filtration filter is different from the photocatalytic filter.

The purification method preferably includes a filtering step, a measuring step, a switching step, a processing step, and an introducing step.

<Filtration Filter and Filtering Step>

The filtration filter is not particularly limited and may be appropriately selected depending on the intended purpose, as long as the filtration filter is a filter configured to filter out a process-target material in process-target water. Examples of the filtration filter include an adsorption filter including an adsorbent and a sterilizing filter.

A shape, size, and structure of the filtration filter are not particularly limited and may be appropriately selected depending on the intended purpose.

The filtering step is not particularly limited and may be appropriately selected depending on the intended purpose, as long as the filtering step is a step including filtering out a process-target material in process-target water with the filtration filter.

Examples of the process-target water include water of swimming pools and water of water tanks.

Examples of the process-target material include microorganisms, bacteria, and organic compounds.

<Main Flow Passage>

The main flow passage is a flow passage configured to connect between the filtration filter and a tank. The main flow passage enables circulation of the process-target water between the tank and the filtration filter.

A material, shape, size, and structure of the main flow passage are not particularly limited and may be appropriately selected depending on the intended purpose.

The tank is not particularly limited and may be appropriately selected depending on the intended purpose, as long as the tank is a container capable of storing a fluid. Examples of the tank include swimming pools, water tanks, reservoirs, and ponds or lakes.

<Measuring Unit and Measuring Step>

The measuring unit is not particularly limited and may be appropriately selected depending on the intended purpose, as long as the measuring unit is a unit configured to measure water quality in the tank. Examples of the measuring unit include turbidimeters.

The measuring step is not particularly limited and may be appropriately selected depending on the intended purpose, and the measuring step is a step including measuring water quality in the tank with the measuring unit.

<First Auxiliary Flow Passage>

A material, shape, size, and structure of the first auxiliary flow passage are not particularly limited and may be appropriately selected depending on the intended purpose, as long as the first auxiliary flow passage is a flow passage configured to introduce the process-target water to the photocatalytic filter.

<Switching Unit and Switching Step>

The switching unit is not particularly limited and may be appropriately selected depending on the intended purpose, as long as the switching unit is arranged in the main flow passage and is a unit configured to switch a flow direction of the process-target water to the first auxiliary flow passage depending on a measurement result of the measuring unit. Examples of the switching unit include valves. Examples of the valves include flush valves, ball valves, and solenoid valves.

The switching step is not particularly limited and may be appropriately selected depending on the intended purpose, as long as the switching step is a step including switching a flow direction of the process-target water by the switching unit from the main flow passage to the first auxiliary flow passage depending on a measurement results of the measuring unit.

For example, the switching unit is controlled by a controlling unit configured to control the switching unit. Then, a measurement result of the measuring unit is transmitted to the controlling unit, and the controlling unit instructs the switching unit to operate to perform the switching step. The controlling unit is not particularly limited and may be appropriately selected depending on the intended purpose, as long as the controlling unit is a unit configured to control the switching unit. Examples of the controlling unit include computers.

<Processing Step>

The processing step is not particularly limited and may be appropriately selected depending on the intended purpose, as long as the processing step is a step including processing the process-target water with the photocatalytic filter.

In the processing step, the process-target water is allowed to pass through the container of the photocatalytic filter. During passing through the container, ultraviolet rays are emitted from the light source, and the process-target water is purified by photocatalysis of the first photocatalytic particles and the second photocatalytic particles in the container.

<Second Auxiliary Flow Passage>

A material, shape, size, and structure of the second auxiliary flow passage are not particularly limited and may be appropriately selected depending on the intended purpose, as long as the second auxiliary flow passage is a flow passage configured to introduce the process-target water processed by the photocatalytic filter to the main flow passage or the tank.

<Introducing Step>

The introducing step is not particularly limited and may be appropriately selected depending on the intended purpose, as long as the introducing is a step including introducing the process-target water processed by the photocatalytic filter to the main flow passage or the tank. For example, the introducing step can be performed by the second auxiliary flow passage.

For example, a flow of the process-target water inside the purification device can be created by arranging a pump at least in one of the main flow passage, the first auxiliary flow passage, and the second auxiliary flow passage.

One example of the purification device and the purification method is described with reference to a drawing.

Figure 4:
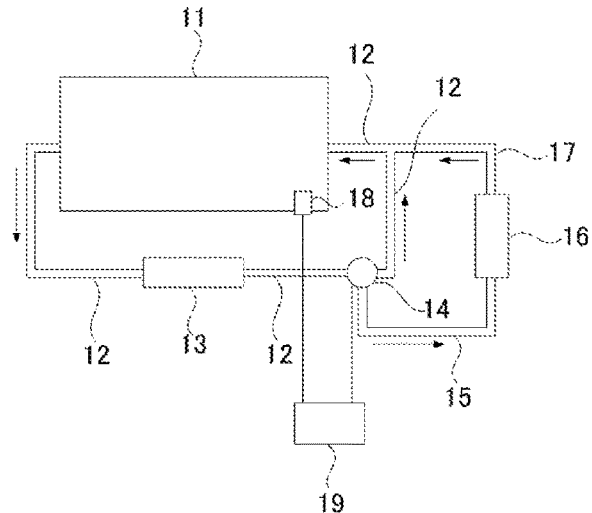
FIG. 4 is a schematic view illustrating one example of a purification device.

FIG. 4 is a schematic view illustrating one example of the purification device.

The purification device of FIG. 4 includes a main flow passage 12, a filtration filter 13, a switching unit 14, a first auxiliary flow passage 15, a photocatalytic filter 16, a second auxiliary flow passage 17, a measuring unit 18, and a controlling unit 19.

In the purification device of FIG. 4, the filtration filter 13 is connected to a tank 11 with the main flow passage 12. The main flow passage 12 enables the process-target water to circulate between the filtration filter 13 and the tank 11. Inside the main flow passage 12, the first auxiliary flow passage 15, and the second auxiliary flow passage 17, the process-target water flows in the direction indicated with an arrow in FIG. 4. The switching unit 14 is arranged in the main flow passage 12 at the downstream side from the filtration filter 13. The first auxiliary flow passage 15 connects between the switching unit 14 and the photocatalytic filter 16. The second auxiliary flow passage 17 connects between the photocatalytic filter 16 and the main flow passage 12. The measuring unit 18 is arranged inside the tank 11. The measuring unit 18 and the switching unit 14 are coupled with each other via the controlling unit 19. The switching unit 14 is a valve. The measuring unit 18 is a turbidimeter. The controlling unit 19 is a computer.

One example of a purification method using the purification device of FIG. 4 will be described.

Water stored in the tank 11 is circulated between the filtration filter 13 and the tank 11 through the main flow passage 12. At the time of the circulation, the filtration filter 13 purifies process-target water. However, very fine organic compounds cannot be removed by the filtration filter 13. Therefore, purification with the photocatalytic filter is used in combination to enhance purification capability of the purification device. Specifically, water quality (turbidity) of process-target water is measured by the measuring unit 18 that is a turbidimeter. When water quality goes below a certain standard due to deterioration of water quality of process-target water (increase in turbidity), the switching unit 14 that is a valve is operated by the controlling unit 19 based on the measurement result of the measuring unit 18, to switch a flow direction of the process-target water to thereby introduce the process-target water to the photocatalytic filter 16 through the first auxiliary flow passage 15. In the photocatalytic filter 16, the process-target water is purified by photocatalysis of the first photocatalytic particles and the second photocatalytic particles. The purified process-target water is returned to the tank 11 through the second auxiliary flow passage 17.

The purification device of FIG. 4 may include a pump configured to make the process-target water flow, according to the necessity. In the case where the tank is a swimming pool, moreover, the purification device preferably includes a hair catcher in the main flow passage 12, where the hair catcher is configured to remove hairs from the process-target water. The hair catcher is preferably arranged at a position that is between the tank 11 and the filtration filter 13 and is at the upperstream side from the filtration filter 13 relative to a flow direction of the process-target water.

Water of a swimming pool is polluted with sweat, dust, hairs, fats, bacteria, nasal mucus, excreta, etc. of swimmers. Accordingly, pollutants of the water are removed by sterilizing with hypochlorous acid and filtering. However, very fine organic pollutants cannot be completely removed by filtering.

In order to make water of a swimming pool meet a water quality standard (turbidity of 2 or lower), an ozone treatment or a method for irradiating the water with strong ultraviolet rays is mentioned. However, the ozone treatment and the above-mentioned method have problems in terms of cost and health and safety of operators.

In the purification device of FIG. 4 that is one example of the disclosed purification device, water is purified with the filtration filter if water quality is not significantly deteriorated. In the case where water quality is significantly deteriorated, a purification capability can be improved by using the filtration filter and the disclosed photocatalytic filter in combination. Water of the swimming pool can be made match the water quality standard by using the filtration filter and the photocatalytic filter in combination. Moreover, a service life of the photocatalytic filter can be prolonged by using the photocatalytic filter only when it is necessary.

The present disclosure aims to solve the above-described various problems existing in the art and to achieve the following object. Specifically, the present disclosure has an object to provide a photocatalytic filter having excellent purification performance, a purification device having excellent purification performance, and a purification method having excellent purification performance.

The disclosed photocatalytic filter can solve the above-described various problems existing in the art, can achieve the object, and can provide a photocatalytic filter having excellent purification performance.

The disclosed purification device can solve the above-described various problems existing in the art, can achieve the object, and can provide a purification device having excellent purification performance.

The disclosed purification method can solve the above-described various problems existing in the art, can achieve the object, and can provide a purification device having excellent purification method.

EXAMPLES

Examples of the disclosed photocatalytic filter will be described hereinafter, but the disclosed photocatalytic filter shall not be construed as being limited to Examples below.

Production Example 1

<Production of First Photocatalytic Particles>

Titanium Apatite (PHOTOHAP PCAP-100, Available From TAIHEI CHEMICAL INDUSTRIAL CO., LTD.), diatomaceous earth (RADIOLITE, available from Showa Chemical Industry Co., Ltd.), and clay (FANDO, available from ARTCLAY CO., LTD.) were homogeneously kneaded at a ratio (mass ratio) of titanium apatite:diatomaceous earth:clay=50:20:30, and the mixture was shaped into spheres each having a diameter of 1 cm, followed by baking at 500° C., to thereby obtain first photocatalytic particles (average particle diameter: 1 cm).

Production Example 2

<Production of Second Photocatalytic Particles>

Figure 5:
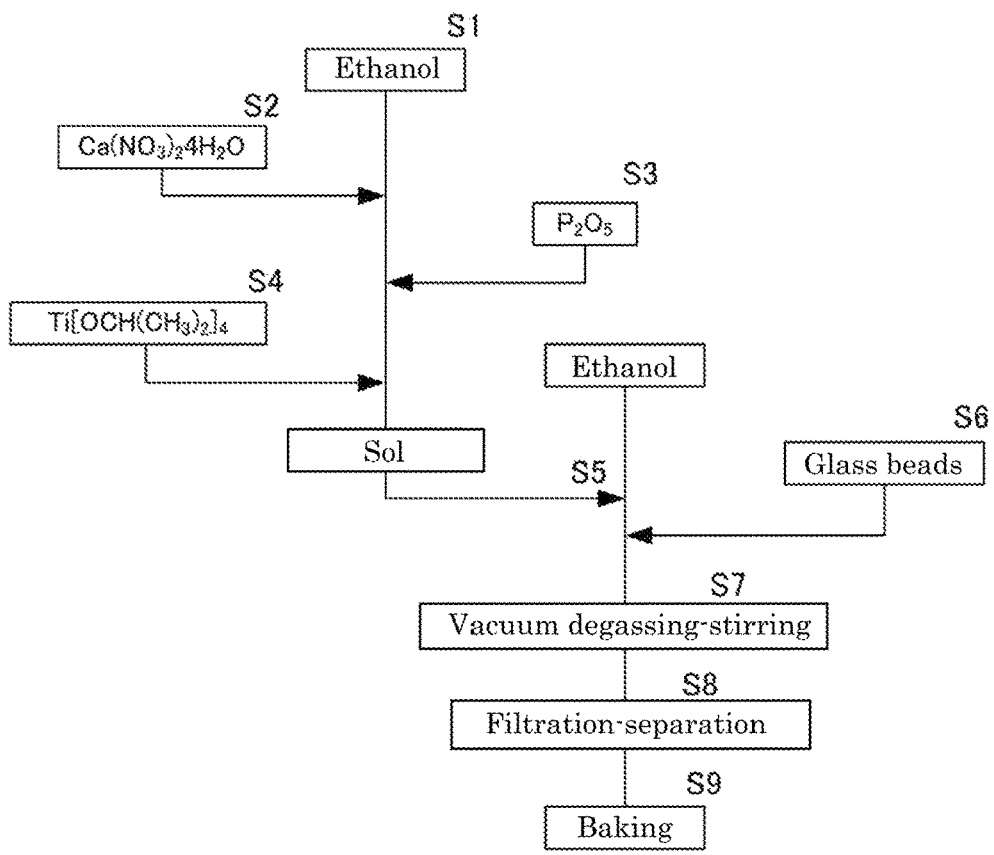
FIG. 5 is a diagram depicting a production flow of second photocatalytic particles according to a sol-gel method.

Second photocatalytic particles were produced by a sol-gel method. Specifically, the second photocatalytic particles were produced by a method below according to the production flow of FIG. 5. Note that, Steps S1 to S8 were performed at room temperature.

(1) In Step S1, 100 mL of ethanol (solvent) was provided. In Step S2, calcium nitrate tetrahydrate ($Ca(NO_3)_2 \cdot 4H_2O$, 2.125 g) was added to the ethanol, and the mixture was stirred at room temperature until the calcium nitrate was completely dissolved.

(2) In Step S3, phosphorus pentaoxide ($P_2O_5$, 0.4258 g) was added to the resultant solution, and the mixture was further stirred for 2 hours.

(3) In Step S4, titanium(IV) isopropoxide ($Ti[OCH(CH_3)_2]_4$, 0.2842 g) was further added to the resultant to prepare a liquid mixture. The liquid mixture was stirred for about 19 hours at room temperature to react, to thereby obtain a pale yellow sol that was an apatite precursor composition.

(4) In Step S5, the sol was further added to 10 L of ethanol, and the resultant mixture was stirred.

(5) In Step S6, glass beads (BRIGHT BEADS, available from Bright Marking Industry Co., Ltd.) having the average particle diameter of 1 cm were added to the resultant solution. In Step S7, vacuum degassing was performed, followed by stirring the resultant for 10 hours at room temperature.

(6) In Step S8, subsequently, a solid product was filtered out and separated. In Step S9, the solid product was dried for 6 hours at 150° C., followed by performing annealing in the atmosphere for 1 hour at 500° C., to thereby obtain second photocatalytic particles (average particle diameter: 1 cm).

A crystal phase of the second photocatalytic particles obtained in the above-described manner was determined by X-ray diffraction. As a result, a diffraction pattern indicating an apatite structure was obtained. Moreover, a surface analysis of the second photocatalytic particles was performed by XPS. As a result, peaks of Ca and Ti that were metal components of titanium apatite were observed.

Production Example 3

<Production of Photocatalytic Particles Formed by Coating Glass with Titanium Dioxide>

Titanium dioxide was produced from titanium(IV) isopropoxide ($Ti[OCH(CH_3)_2]_4$) by a sol-gel method. During the production of the titanium dioxide, a reaction was performed in a reaction tank, in which glass beads (BRIGHT BEADS, available from Bright Marking Industry Co., Ltd.) having the average particle diameter of 1 cm were added, to produce photocatalytic particles (average particle diameter: 1 cm) formed by coating glass with titanium dioxide.

Production Example 4

<Production of First Photocatalytic Particles>

First photocatalytic particles were obtained in the same manner as in Production Example 1, except that the diatomaceous earth was replaced with zeolite (MIZUKASIEVES, available from MIZUSAWA INDUSTRIAL CHEMICAL, LTD., pore diameter: about 10 nm).

Production Example 5

<Production of First Photocatalytic Particles>

First photocatalytic particles were obtained in the same manner as in Production Example 1, except that the diatomaceous earth was replaced with silica (Silbead N, available from MIZUSAWA INDUSTRIAL CHEMICAL, LTD., pore diameter: about 10 nm).

Example 1

<Production of Photocatalytic Filter>

As a container of a photocatalytic filter, a cylindrical container formed of SUS having an inner diameter of 10 cm and a height of 30 cm was provided. Note that, an opening for allowing water to circulate was provided on each of two bases of the container.

A black light serving as a light source was disposed on a central axis of the container. Moreover, the first photocatalytic particles obtained in Production Example 1 and the second photocatalytic particles obtained in Production Example 2 were placed in the container in a manner that inside the container, the first photocatalytic particles and the second photocatalytic particles were arranged as illustrated in FIGS. 1A and 1B (the arrangement where first photocatalytic particles 3 and second photocatalytic particles 4 were alternately arranged relative to all of the X-axial direction, the Y-axial direction, and the Z-axial direction that were orthogonal to one another) (at a volume ratio of the first photocatalytic particles:the second photocatalytic particles=about 50:about 50).

In the manner as described above, a photocatalytic filter was obtained.

<Bisphenol a Decomposition Test>

A tank having a volume of 100 L was charged with 80 L of pure water. The photocatalytic filter was installed in the tank with piping. The installation was performed in a manner that the water was allowed to circulate between the tank and the photocatalytic filter.

After adding 1.828 g of bisphenol A (BPA), the water was circulated a whole day and night to provide a BPA aqueous solution of $10^{-4}$M.

Figure 6:
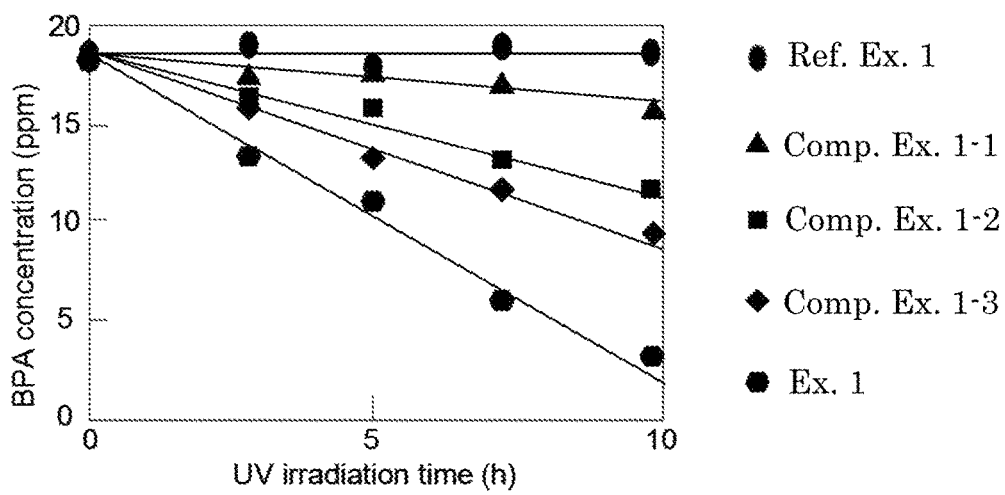
FIG. 6 is a graph depicting the results of the bisphenol A decomposition tests (with UV irradiation) of Example 1, Comparative Examples 1-1 to 1-3, and Referential Example 1.

A BPA decomposition test by the photocatalytic filter was performed under the following conditions.
Light dose: 1 mW/cm$^2$
Water-circulation speed: 20 L/min
Sampling: 1 hour, 2 hours, 3 hours, 4 hours, 5 hours, 6 hours, 7 hours, 8 hours The sampled water was subjected to a quantitative analysis of BPA by high-performance liquid chromatography (HPLC). The result is presented in FIG. 6.

Figure 7:
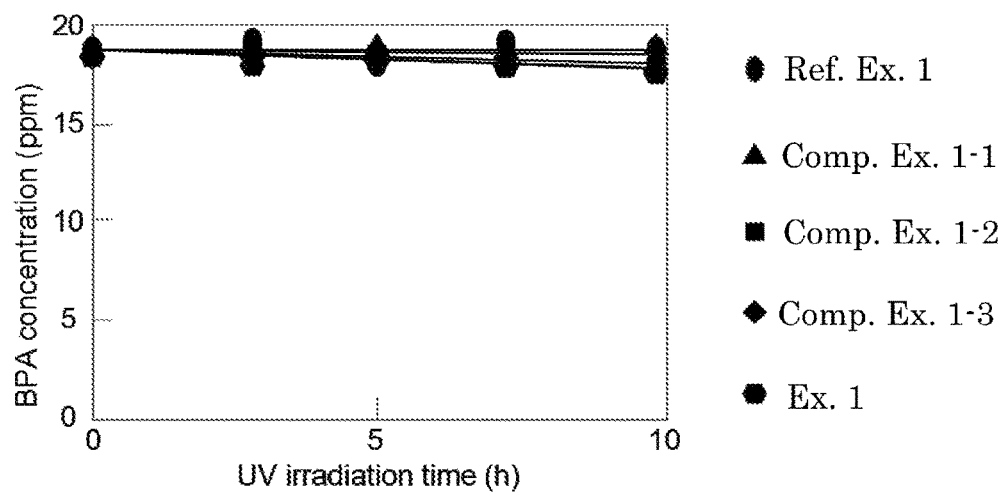
FIG. 7 is a graph depicting the results of the bisphenol A decomposition tests (no UV irradiation) of Example 1, Comparative Examples 1-1 to 1-3, and Referential Example 1.

Moreover, a test of a negative condition (no UV irradiation) was performed. The result is presented in FIG. 7.

Comparative Example 1-1

A photocatalytic filter was produced in the same manner as in Example 1, except that all of the photocatalytic particles were replaced with the first photocatalytic particles obtained in Production Example 1 (specifically, only the first photocatalytic particles were used as photocatalytic particles).

A bisphenol A decomposition test was performed in the same manner as in Example 1. The result is presented in FIG. 6.

Moreover, a test of a negative condition (no UV irradiation) was performed. The result is presented in FIG. 7.

In the case where only the first photocatalytic particles were accommodated in the container (the second photocatalytic particles were not accommodated in the container), the diatomaceous earth gradually absorbed ultraviolet rays and therefore ultraviolet rays did not easily reach the first photocatalytic particles far from the light source. Accordingly, purification performance of the photocatalytic filter of Comparative Example 1-1 was lower than the purification performance of the photocatalytic filter of Example 1.

Comparative Example 1-2

A photocatalytic filter was produced in the same manner as in Example 1, except that the second photocatalytic particles were replaced with glass beads (average particle diameter: 1 cm, BRIGHT BEADS, available from Bright Marking Industry Co., Ltd.).

A bisphenol A decomposition test was performed in the same manner as in Example 1. The result is presented in FIG. 6.

Moreover, a test of a negative condition (no UV irradiation) was performed. The result is presented in FIG. 7.

In the case where the first photocatalytic particles and the granular glass were accommodated in the container, ultraviolet rays reached the first photocatalytic particles far from the light source owing to ultraviolet transparency of the granular glass. However, a total amount of the photocatalytic particles was reduced by the amount of the granular glass accommodated. Accordingly, purification performance of the photocatalytic filter of Comparative Example 1-2 was lower than the purification performance of the photocatalytic filter of the Example 1.

Comparative Example 1-3

A photocatalytic filter was produced in the same manner as in Example 1, except that the second photocatalytic particles were replaced with the second photocatalytic particles obtained in Production Example 3.

A bisphenol A decomposition test was performed in the same manner as in Example 1. The result is presented in FIG. 6.

Moreover, a test of a negative condition (no UV irradiation) was performed. The result is presented in FIG. 7.

In the case where the first photocatalytic particles and the photocatalytic particles formed by coating glass with titanium dioxide were accommodated in the container, ultraviolet rays easily reached the first photocatalytic particles far from the light source and the photocatalytic particles formed by coating glass with titanium dioxide far from the light source owing to ultraviolet transparency of the photocatalytic particles formed by coating glass with titanium dioxide. However, the photocatalytic particles formed by coating glass with titanium dioxide caused interference at an interface between the glass and the titanium dioxide to reduce ultraviolet rays. Therefore, the ultraviolet transparency was lower than the ultraviolet transparency of the second photocatalytic particles. Accordingly, purification performance of the photocatalytic filter of Comparative Example 1-3 was lower than the purification performance of the photocatalytic filter of Example 1.

Example 2

A photocatalytic filter was produced in the same manner as in Example 1, except that the first photocatalytic particles were replaced with the first photocatalytic particles in Production Example 4.

Figure 8:
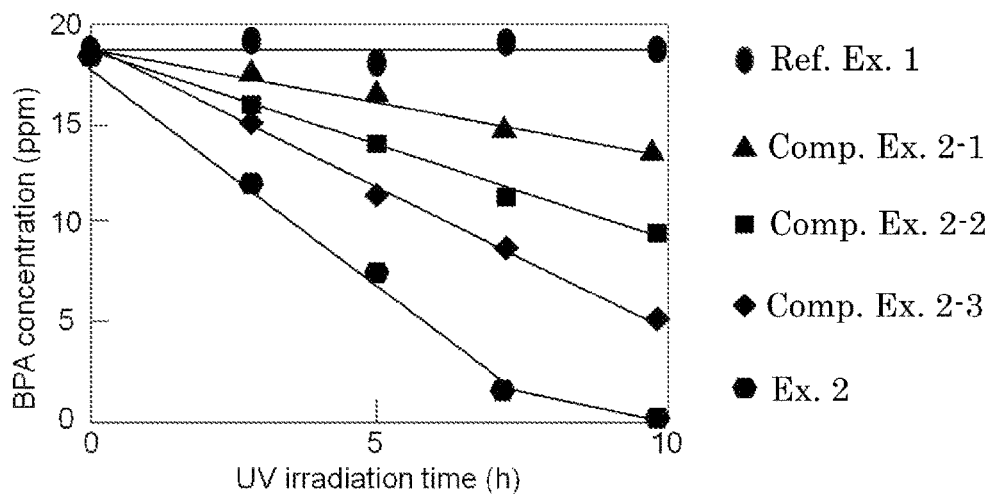
FIG. 8 is a graph depicting the results of the bisphenol A decomposition tests (with UV irradiation) of Example 2, Comparative Examples 2-1 to 2-3, and Referential Example 1.

A bisphenol A decomposition test was performed in the same manner as in Example 1. The result is presented in FIG. 8.

Figure 9:
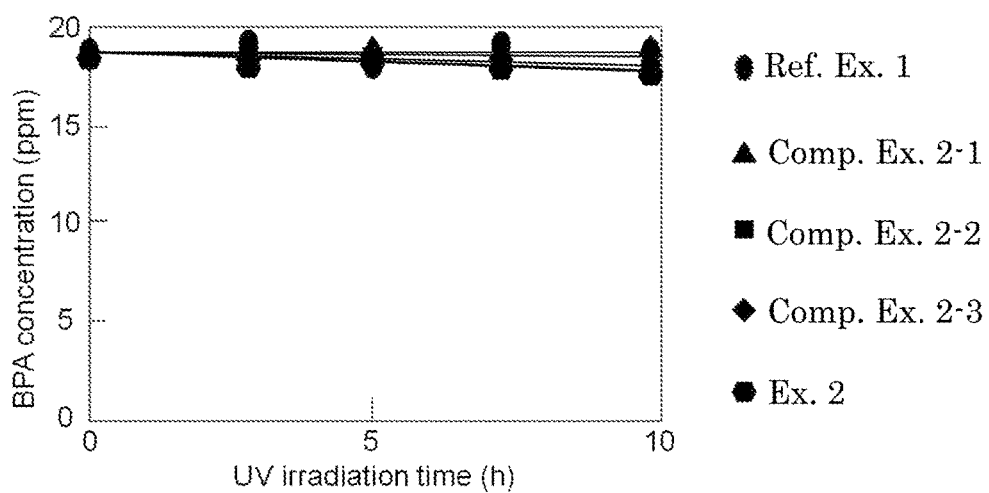
FIG. 9 is a graph depicting the results of the bisphenol A decomposition tests (no UV irradiation) of Example 2, Comparative Examples 2-1 to 2-3, and Referential Example 1.

Moreover, a test of a negative condition (no UV irradiation) was performed. The result is presented in FIG. 9.

Comparative Example 2-1

A photocatalytic filter was produced in the same manner as in Example 2, except that all of the photocatalytic particles were replaced with the first photocatalytic particles obtained in Production Example 4 (specifically, only the first photocatalytic particles were used as photocatalytic particles).

A bisphenol A decomposition test was performed in the same manner as in Example 2. The result is presented in FIG. 8.

Moreover, a test of a negative condition (no UV irradiation) was performed. The result is presented in FIG. 9.

In the case where only the first photocatalytic particles were accommodated in the container (the second photocatalytic particles were not accommodated in the container), the zeolite gradually absorbed ultraviolet rays and therefore ultraviolet rays did not easily reach the first photocatalytic particles far from the light source. Accordingly, purification performance of the photocatalytic filter of Comparative Example 2-1 was lower than the purification performance of the photocatalytic filter of Example 2.

Comparative Example 2-2

A photocatalytic filter was produced in the same manner as in Example 2, except that the second photocatalytic particles were replaced with glass beads (average particle diameter: 1 cm, BRIGHT BEADS, available from Bright Marking Industry Co., Ltd.).

A bisphenol A decomposition test was performed in the same manner as in Example 2. The result is presented in FIG. 8.

Moreover, a test of a negative condition (no UV irradiation) was performed. The result is presented in FIG. 9.

In the case where the first photocatalytic particles and the granular glass were accommodated in the container, ultraviolet rays reached the first photocatalytic particles far from the light source owing to ultraviolet transparency of the granular glass. However, a total amount of the photocatalytic particles was reduced by the amount of the granular glass accommodated. Accordingly, purification performance of the photocatalytic filter of Comparative Example 2-2 was lower than the purification performance of the photocatalytic filter of the Example 2.

Comparative Example 2-3

A photocatalytic filter was produced in the same manner as in Example 2, except that the second photocatalytic particles were replaced with the second photocatalytic particles obtained in Production Example 3.

A bisphenol A decomposition test was performed in the same manner as in Example 2. The result is presented in FIG. 8.

Moreover, a test of a negative condition (no UV irradiation) was performed. The result is presented in FIG. 9.

In the case where the first photocatalytic particles and the photocatalytic particles formed by coating glass with titanium dioxide were accommodated in the container, ultraviolet rays easily reached the first photocatalytic particles far from the light source and the photocatalytic particles formed by coating glass with titanium dioxide far from the light source owing to ultraviolet transparency of the photocatalytic particles formed by coating glass with titanium dioxide. However, the photocatalytic particles formed by coating glass with titanium dioxide caused interference at an interface between the glass and the titanium dioxide to reduce ultraviolet rays. Therefore, the ultraviolet transparency was lower than the ultraviolet transparency of the second photocatalytic particles. Accordingly, purification performance of the photocatalytic filter of Comparative Example 2-3 was lower than the purification performance of the photocatalytic filter of Example 2.

Example 3

A photocatalytic filter was produced in the same manner as in Example 1, except that the first photocatalytic particles were replaced with the first photocatalytic particles produced in Production Example 5.

Figure 10:
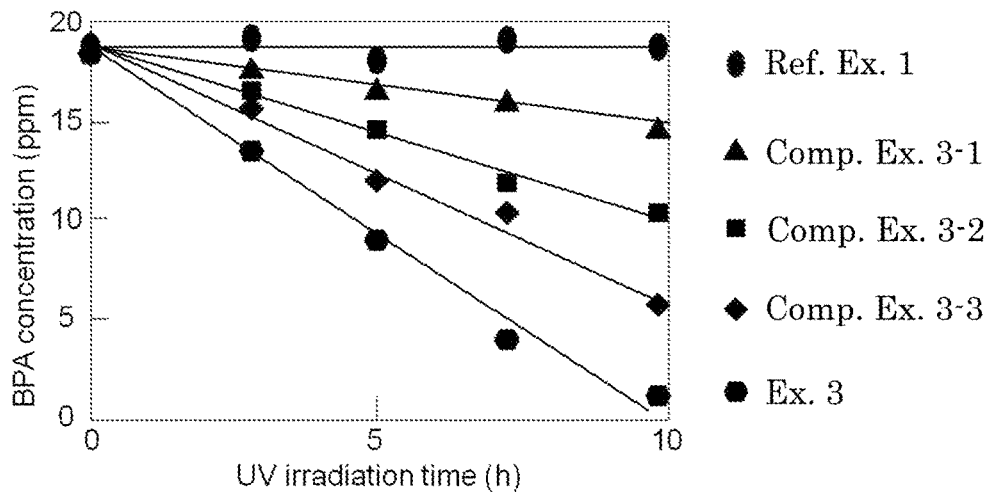
FIG. 10 is a graph depicting the results of the bisphenol A decomposition tests (with UV irradiation) of Example 3, Comparative Examples 3-1 to 3-3, and Referential Example 1.

A bisphenol A decomposition test was performed in the same manner as in Example 1. The result is presented in FIG. 10.

Figure 11:
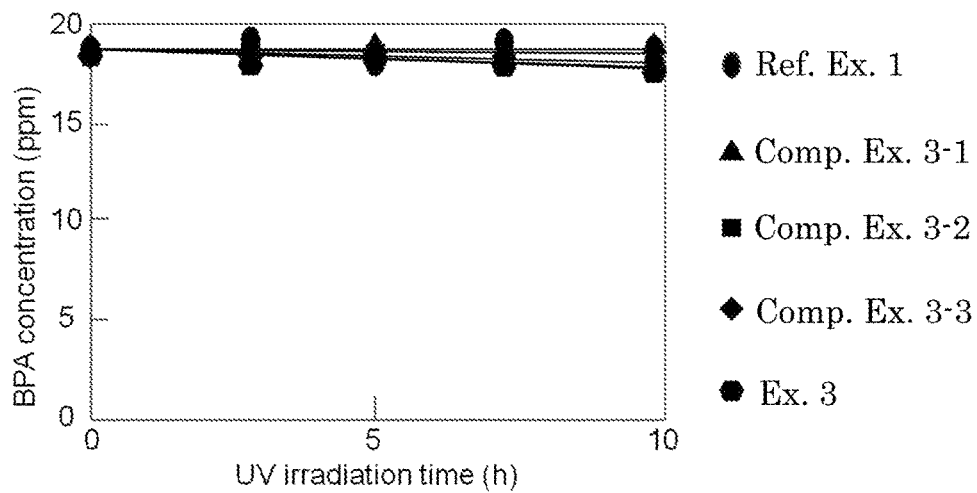
FIG. 11 is a graph depicting the results of the bisphenol A decomposition tests (no UV irradiation) of Example 3, Comparative Examples 3-1 to 3-3, and Referential Example 1.

Moreover, a test of a negative condition (no UV irradiation) was performed. The result is presented in FIG. 11.

Comparative Example 3-1

A photocatalytic filter was produced in the same manner as in Example 3, except that all of the photocatalytic particles were replaced with the first photocatalytic particles obtained in Production Example 5 (specifically, only the first photocatalytic particles were used as photocatalytic particles).

A bisphenol A decomposition test was performed in the same manner as in Example 3. The result is presented in FIG. 10.

Moreover, a test of a negative condition (no UV irradiation) was performed. The result is presented in FIG. 11.

In the case where only the first photocatalytic particles were accommodated in the container (the second photocatalytic particles were not accommodated in the container), the silica gradually absorbed ultraviolet rays and therefore ultraviolet rays did not easily reach the first photocatalytic particles far from the light source. Accordingly, purification performance of the photocatalytic filter of Comparative Example 3-1 was lower than the purification performance of the photocatalytic filter of Example 3.

Comparative Example 3-2

A photocatalytic filter was produced in the same manner as in Example 3, except that the second photocatalytic particles were replaced with glass beads (average particle diameter: 1 cm, BRIGHT BEADS, available from Bright Marking Industry Co., Ltd.).

A bisphenol A decomposition test was performed in the same manner as in Example 3. The result is presented in FIG. 10.

Moreover, a test of a negative condition (no UV irradiation) was performed. The result is presented in FIG. 11.

In the case where the first photocatalytic particles and the granular glass were accommodated in the container, ultraviolet rays reached the first photocatalytic particles far from the light source owing to ultraviolet transparency of the granular glass. However, a total amount of the photocatalytic particles was reduced by the amount of the granular glass accommodated. Accordingly, purification performance of the photocatalytic filter of Comparative Example 3-2 was lower than the purification performance of the photocatalytic filter of the Example 3.

Comparative Example 3-3

A photocatalytic filter was produced in the same manner as in Example 3, except that the second photocatalytic particles were replaced with the second photocatalytic particles obtained in Production Example 3.

A bisphenol A decomposition test was performed in the same manner as in Example 3. The result is presented in FIG. 10.

Moreover, a test of a negative condition (no UV irradiation) was performed. The result is presented in FIG. 11.

In the case where the first photocatalytic particles and the photocatalytic particles formed by coating glass with titanium dioxide were accommodated in the container, ultraviolet rays easily reached the first photocatalytic particles far from the light source and the photocatalytic particles formed by coating glass with titanium dioxide far from the light source owing to ultraviolet transparency of the photocatalytic particles formed by coating glass with titanium dioxide. However, the photocatalytic particles formed by coating glass with titanium dioxide caused interference at an interface between the glass and the titanium dioxide to reduce ultraviolet rays. Therefore, the ultraviolet transparency was lower than the ultraviolet transparency of the second photocatalytic particles. Accordingly, purification performance of the photocatalytic filter of Comparative Example 3-3 was lower than the purification performance of the photocatalytic filter of Example 3.

Referential Example 1

<Blank>
A bisphenol A decomposition test was performed in the same manner as in Example 1, except that the first photocatalytic particles and the second photocatalytic particles were removed from the cylindrical container formed of SUS. The result is presented in FIGS. 6, 8, and 10.

Moreover, a test of a negative condition (no UV irradiation) was performed. The result is presented in FIGS. 7, 9, and 11.

The particles used in Examples and Comparative Examples are summarized below.

TABLE 1

| | Ingredients | | | |
|---|---|---|---|---|
| Production Example 1 | first photocatalytic particles | diatomaceous earth | titanium apatite | clay |
| Production Example 2 | second photocatalytic particles | glass | titanium apatite | — |
| Production Example 3 | photocatalytic particles | glass | titanium dioxide | — |
| Production Example 4 | first photocatalytic particles | zeolite | titanium apatite | clay |
| Production Example 5 | first photocatalytic particles | silica | titanium apatite | clay |

TABLE 2-1

| | (Photocatalytic) particles | |
|---|---|---|
| Example 1 | first photocatalytic particles of Production Example 1 | second photocatalytic particles of Production Example 2 |
| Comparative Example 1-1 | first photocatalytic particles of Production Example 1 | |
| Comparative Example 1-2 | first photocatalytic particles of Production Example 1 | glass beads |
| Comparative Example 1-3 | first photocatalytic particles of Production Example 1 | photocatalytic particles of Production Example 3 |

TABLE 2-2

| | (Photocatalytic) particles | |
|---|---|---|
| Example 2 | first photocatalytic particles of Production Example 4 | second photocatalytic particles of Production Example 2 |
| Comparative Example 2-1 | first photocatalytic particles of Production Example 4 | |
| Comparative Example 2-2 | first photocatalytic particles of Production Example 4 | glass beads |
| Comparative Example 2-3 | first photocatalytic particles of Production Example 4 | photocatalytic particles of Production Example 3 |

TABLE 2-3

| | (Photocatalytic) particles | |
|---|---|---|
| Example 3 | first photocatalytic particles of Production Example 5 | second photocatalytic particles of Production Example 2 |
| Comparative Example 3-1 | first photocatalytic particles of Production Example 5 | |
| Comparative Example 3-2 | first photocatalytic particles of Production Example 5 | glass beads |
| Comparative Example 3-3 | first photocatalytic particles of Production Example 5 | photocatalytic particles of Production Example 3 |

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the sprit and scope of the invention.

What is claimed is:

1. A photocatalytic filter comprising:
   first photocatalytic particles each of which is a composite of an adsorbent and titanium apatite;
   second photocatalytic particles each of which is glass coated with titanium apatite;
   a light source configured to emit ultraviolet rays; and
   a container accommodating the first photocatalytic particles, the second photocatalytic particles, and the light source.

2. The photocatalytic filter according to claim 1, wherein the first photocatalytic particles and the second photocatalytic particles are alternately arranged inside the container.

3. The photocatalytic filter according to claim 1, wherein
   a shape of the container is a cylindrical shape,
   a shape of the light source is a rod shape, and
   the light source is arranged on a central axis of the container.

4. The photocatalytic filter according to claim 1, wherein each of the first photocatalytic particles is a mixture of the adsorbent, the titanium apatite, and clay.

5. A purification device comprising;
   a photocatalytic filter,
   wherein the photocatalytic filter includes:
      first photocatalytic particles each of which is a composite of an adsorbent and titanium apatite;
      second photocatalytic particles each of which is glass coated with titanium apatite;
      a light source configured to emit ultraviolet rays; and
      a container accommodating the first photocatalytic particles, the second photocatalytic particles, and the light source.

6. The purification device according to claim 5, further comprising:
   a filtration filter configured to filter out a process-target material in process-target water;
   a main flow passage configured to connect between the filtration filter and a tank and enabling circulation of the process-target water between the tank and the filtration filter;
   a measuring unit configured to measure water quality in the tank;
   a first auxiliary flow passage configured to introduce the process-target water to the photocatalytic filter;
   a switching unit arranged in the main flow passage and configured to switch a flow direction of the process-target water to the first auxiliary flow passage depending on a measurement result of the measuring unit; and
   a second auxiliary flow passage configured to introduce the process-target water processed by the photocatalytic filter to the main flow passage or the tank.

7. A purification method comprising:
   processing process-target water with a photocatalytic filter including:
      first photocatalytic particles each of which is a composite of an adsorbent and titanium apatite;
      second photocatalytic particles each of which is glass coated with titanium apatite;
      a light source configured to emit ultraviolet rays; and
      a container accommodating the first photocatalytic particles, the second photocatalytic particles, and the light source.

8. The purification method according to claim 7, further comprising:
   filtering out a process-target material in process-target water with a filtration filter configured to filter out the process-target material in the process-target water;
   measuring water quality in a tank with a measuring unit configured to measure the water quality in the tank;
   switching a flow direction of the process-target water from a main flow passage to a first auxiliary flow passage with a switching unit depending on a measurement result of the measuring unit, where the main flow passage is configured to connect between the filtration filter and the tank and enables circulation of the process-target water between the tank and the filtration filter, and the first auxiliary flow passage is configured to introduce the process-target water to the photocatalytic filter; and
   introducing the process-target water processed with the photocatalytic filter to the main flow passage or the tank.

* * * * *